(12) United States Patent
Watanabe

(10) Patent No.: US 8,065,639 B2
(45) Date of Patent: Nov. 22, 2011

(54) SEMICONDUCTOR INTEGRATED CIRCUIT DESIGNING METHOD

(75) Inventor: Kentaro Watanabe, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 741 days.

(21) Appl. No.: 12/136,230

(22) Filed: Jun. 10, 2008

(65) Prior Publication Data

US 2008/0313591 A1 Dec. 18, 2008

(30) Foreign Application Priority Data

Jun. 14, 2007 (JP) ................................ 2007-157914

(51) Int. Cl.
*G06F 17/50* (2006.01)

(52) U.S. Cl. ........ 716/100; 716/110; 716/111; 716/114; 716/115; 716/119

(58) Field of Classification Search ................. 716/100, 716/106, 110–120
See application file for complete search history.

(56) References Cited

U.S. PATENT DOCUMENTS

| | | | |
|---|---|---|---|
| 6,075,686 A | 6/2000 | Ker | |
| 2005/0152081 A1 | 7/2005 | Worley | |
| 2006/0218518 A1* | 9/2006 | Hirata | ............................. 716/10 |
| 2007/0223163 A1 | 9/2007 | Hung et al. | |

FOREIGN PATENT DOCUMENTS

JP 2001298157 10/2001

OTHER PUBLICATIONS

Japanese Office Action dated Jun. 30, 2009, corresponding to U.S. Application No. 12/136,230, filed Jun. 10, 2008.

* cited by examiner

*Primary Examiner* — Paul Dinh

(74) *Attorney, Agent, or Firm* — Turocy & Watson, LLP

(57) ABSTRACT

An IC designing method includes planning placement of a first isolated-power supplied region operating between common ground and power bus lines during a normal operation, and second/third isolated-power supplied regions each operating between the common ground bus line and first/second isolated power lines and supplied with potentials different from the common power supply, planning placement of first electrostatic protection circuits connected between the common ground power bus lines and between the common ground bus line and the first/second isolated power lines, and second electrostatic protection circuits connected between the first/second isolated power lines and the common power bus lines, judging presence of a signal transmission between non-adjacent regions among the first to third isolated-power supplied regions, and amending the circuit to insert a buffer circuit powered by the common power bus line in a transmission path when the signal transmission is present.

14 Claims, 9 Drawing Sheets

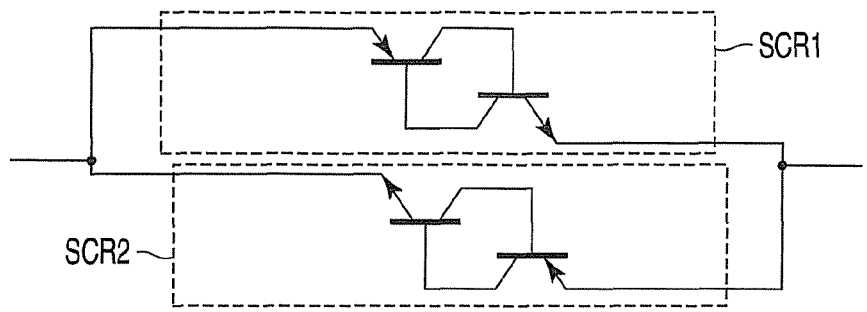
F I G. 6
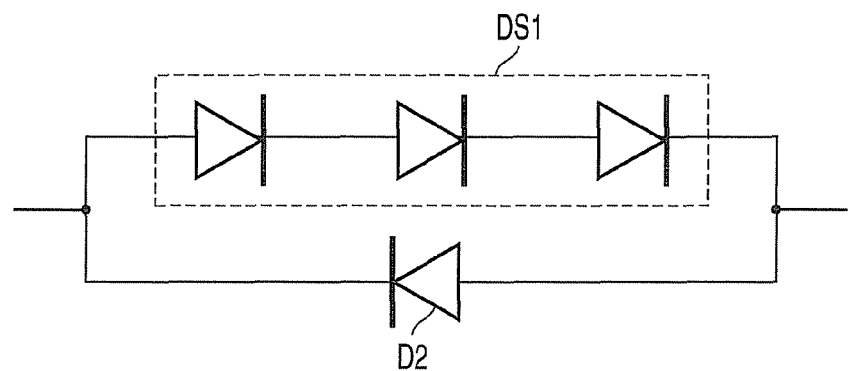
F I G. 7
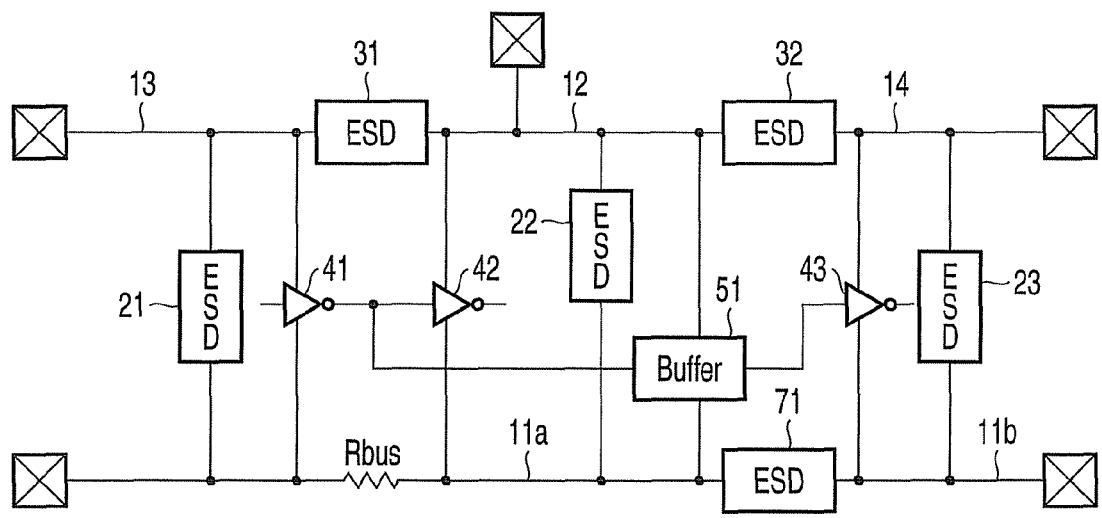
F I G. 8

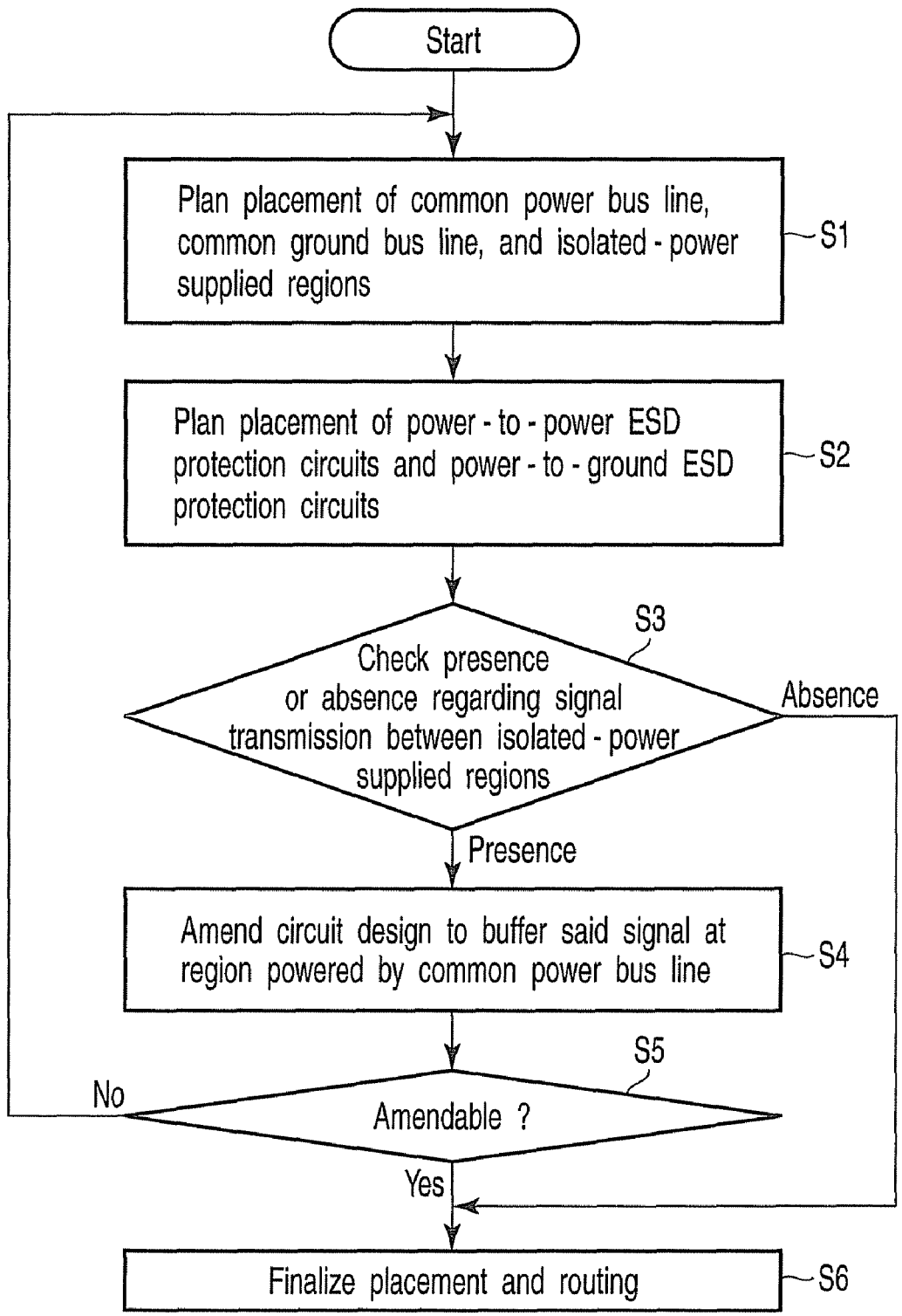
F I G. 9

SEMICONDUCTOR INTEGRATED CIRCUIT DESIGNING METHOD

CROSS-REFERENCE TO RELATED APPLICATIONS

This application is based upon and claims the benefit of priority from prior Japanese Patent Application No. 2007-157914, filed Jun. 14, 2007, the entire contents of which are incorporated herein by reference.

BACKGROUND OF THE INVENTION

1. Field of the Invention

The present invention relates to a method of designing a semiconductor integrated circuit incorporating an electrostatic discharge (ESD) protection circuit which protects internal circuits against ESD. More particularly, it relates to a method of designing a semiconductor integrated circuit in which signals are transmitted/received among a plurality of internal circuits operated by different power supply potentials.

2. Description of the Related Art

A plurality of power supply nodes (power supply line or interconnects) isolated for various reasons are used within a semiconductor integrated circuit (hereinafter referred to as an LSI).

The first reason for isolating the power supply nodes lies in the necessity of a plurality of power supply voltages.

An input/output (I/O) circuit unit of the LSI outputs a signal to the output of an LSI chip, and a signal from the outside of the LSI chip is input to the I/O unit. Therefore, a standard for the I/O unit is set to enable the transmission/reception of signals between different LSI chips, and the power supply voltage of the I/O unit is also set. On the other hand, a decreased voltage is effective means for lower power consumption and a higher speed of the LSI, and internal logic circuits other than the I/O unit are typically driven by power supplies at a lower voltage than the I/O unit. It is thus necessary to isolate the power supply nodes.

The second reason for isolating the power supply nodes lies in the measures for noise. When an analog circuit, a radio-frequency (RF) circuit, etc., are incorporated, noise generated by the operation of circuits other that these circuits such as a digital circuit may adversely affect the analog circuit and the RF circuit. Among various conceivable propagation paths of the noise, a path passing through a power supply line can be cited as the main path. In order to prevent an erroneous operation of the circuits, the analog circuit and the RF circuit are isolated from the power supplies of the other circuits.

The third reason for isolating the power supply nodes lies in the measures for reducing the power consumption. In a normal system LSI, there are generally no simultaneous operations of all the circuits within the LSI chip. A technique has therefore been proposed, wherein the LSI internal circuits are classified into function blocks, and no power supply voltage is supplied to the function block during a period at which it does not need to be operated, thereby keeping down the power consumption. In order to achieve this, it is necessary to isolate the power supply nodes on the function block basis.

On the other hand, in a MOS LSI such as a CMOS LSI, an ESD protection circuit is incorporated to protect internal circuits against an overcurrent caused by an ESD. In order to protect against the ESD the LSI in which the power supply nodes are isolated as described above, there has heretofore been a proposal which employs two schemes: a common bus line protection scheme in which all the power supply nodes connected to a power supply terminal are connected to a common node via ESD protection circuits, and a power-to-power protection scheme in which the isolated power supply nodes are connected to one another by an ESD protection circuit (e.g., refer to US2005/0152081).

However, in the case of the power-to-power protection scheme in which the isolated power supply nodes are connected to one another by the ESD protection circuit, an ESD protection circuit can not be inserted between regions which are not adjacent on the chip. Their power supply nodes can be drawn around within the chip so that these power supply nodes may be adjacent to each other, but this is in most cases difficult to achieve due to the limitations of a chip layout.

Furthermore, the insertion of the ESD protection circuit is generally carried out manually after automatic designing in consideration of the flows of signals, which requires experience and time. It has been difficult to clarify all the cases where a signal is transmitted between isolated-power supplied regions which are not adjacent within the chip.

There has thus a demand for the provision of a semiconductor integrated circuit designing method wherein even when a signal is transmitted between isolated-power supplied regions which are not adjacent within a chip, internal circuits can be protected against ESD, and all the circuits within the chip can be protected against the ESD by one ESD protection circuit.

BRIEF SUMMARY OF THE INVENTION

According to one aspect of the invention, there is provided a method of designing a semiconductor integrated circuit, which includes:

planning placement on a semiconductor integrated circuit chip in relation to a first isolated-power supplied region having a circuit which operates between a common ground bus line functioning as a ground potential node and a common power bus line supplied with a common power supply potential during a normal operation, and second and third isolated-power supplied regions each having a circuit which operates between the common ground bus line and first and second isolated power lines, the first and second isolated power lines being isolated from each other and being supplied with power supply potentials different from the common power supply potential;

planning placement on the semiconductor integrated circuit chip in relation to a plurality of first electrostatic protection circuits connected between the common ground bus line and the common power bus line as well as between the common ground bus line and the first and second isolated power lines, and a plurality of second electrostatic protection circuits connected between the first and second isolated power lines and the common power bus lines;

judging presence of a signal transmission between the regions which are not adjacent on the semiconductor integrated circuit chip among the first to third isolated-power supplied regions; and amending a circuit configuration on the semiconductor integrated circuit chip to insert a buffer circuit using the common power bus line as a power supply in a transmission path where the signal transmission is carried out when the signal transmission is judged to be present in the judging presence of the signal transmission.

BRIEF DESCRIPTION OF THE SEVERAL VIEWS OF THE DRAWING

FIG. 6 is a circuit diagram showing the specific configuration of the ESD protection circuit of the power-to-power protection scheme in FIG. 1;

FIG. 7 is a circuit diagram showing the specific configuration of the ESD protection circuit of the power-to-power protection scheme in FIG. 1;

FIG. 8 is a circuit diagram of an LSI according to a modification of the first embodiment;

FIG. 9 is a flowchart of a method of designing the LSI according to the first embodiment;

DETAILED DESCRIPTION OF THE INVENTION

Figure 1:
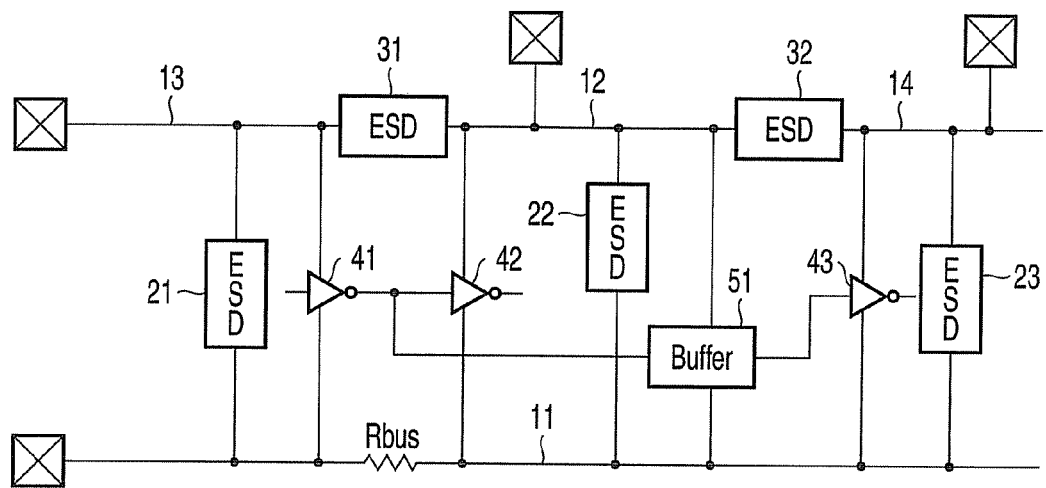
FIG. 1 is a circuit diagram of an LSI according to a first embodiment.

Before describing embodiments, problems of conventional ESD protection circuits are described in more details. As described above, a plurality of power supply voltages may be needed in an integrated circuit. For example, assume a circuit having first to third power supply nodes (power lines, or interconnects). First to third ESD protection circuits are inserted between the power supply nodes and a common ground bus line, and a fourth ESD protection circuit is also inserted between the first and second power supply nodes, while no ESD protection circuit is inserted between the first and third power supply nodes.

No ESD protection circuit is inserted between the second and third power supply nodes, for example, for the following reason. An integrated circuit chip includes a first isolated-power supplied region in which an internal circuit operated by a power supply potential of the first power supply node is formed, a second isolated-power supplied region in which an internal circuit operated by a power supply potential of the second power supply node is formed, and a third isolated-power supplied region in which an internal circuit operated by a power supply potential of the third power supply node is formed.

The first and second isolated-power supplied regions are adjacent within the chip, and the fourth ESD protection circuit can be placed and formed at the border therebetween. However, since the first and third isolated-power supplied regions are not adjacent within the chip, it is not possible to place and form an ESD protection circuit of a power-to-power protection scheme to connect the first and third isolated-power supplied regions to each other. Thus, an interconnect can be drawn around within the chip such that the first and third isolated-power supplied regions may be adjacent to each other, but this is in most cases difficult to achieve due to the limitations of a chip layout design.

Here, if a surge voltage which may cause ESD is applied to any of the first to third power supply nodes, a discharge path, in which any one of the ESD protection circuits is interposed, is formed, such that a voltage in this power supply node is limited to a low value, and a gate oxide film is prevented from being broken by the application of a high voltage to a MOS transistor constituting an internal circuit.

In this case, if a surge voltage is applied whereby the first power line shows a positive pole and the third power line shows a ground potential, a discharge path is formed which extends through the first ESD protection circuit, the common ground bus line and the third ESD protection circuit. However, when a chip size is large or when the sheet resistivity of an interconnect material used in the common ground bus line is high, it is difficult to sufficiently reduce the parasitic resistance value of the common ground bus line.

In the above-mentioned case, the voltage in the first power supply node does not decrease to a voltage equal to or less than the sum of a clamp voltage of the first ESD protection circuit, a drop voltage in a parasitic resistance Rbus of the common ground bus line and a clamp voltage of the third ESD protection circuit. Thus, there is a possibility that a high potential is applied to an input node of a third inverter circuit connected to the third power supply node, that is, to a gate of a p-channel MOS transistor constituting the third inverter circuit via a first inverter circuit connected to the first power supply node.

For example, given that the input node of the third inverter circuit has a ground potential, the p-channel MOS transistor in the third inverter circuit is brought into an ON-state, and the voltage of the first power supply node is applied to the gate of the p-channel MOS transistor constituting the third inverter circuit. At this point, a source of the p-channel MOS transistor in the third inverter circuit connected to the third power supply node has the ground potential, so that a high voltage is applied across the gate and source of this MOS transistor. Thus, when the value of parasitic resistance Rbus of a common ground bus line is high, the gate oxide film of the p-channel MOS transistor in the third inverter circuit, which is a protected oxide film, is broken.

According to the embodiments of the present invention described from now on, it is possible to provide a semiconductor integrated circuit designing method wherein even when a signal is transmitted between isolated-power supplied regions which are not adjacent within a chip, internal circuits can be protected against ESD, and all the circuits within the chip can be protected against the ESD by one electrostatic protection circuit.

Hereinafter, the embodiments of the present invention will be described with reference to the drawings. In the description, like reference signs are assigned to like parts throughout the embodiments.

First Embodiment

FIG. 1 is a circuit diagram of an LSI according to a first embodiment of the present invention. In FIG. 1, 11 denotes a common ground bus line which is connected to a ground terminal supplied with a ground potential and which functions as a grounding line (grounding node or interconnect) during a normal operation, and 12 denotes a power line (power supply node or interconnect) which is connected to a power supply terminal supplied with a power supply potential during a normal operation and which functions as a common power bus line during the application of a surge voltage. Moreover, 13, 14 denote power lines which are connected to power supply terminals supplied with power supply potentials during a normal operation and which are isolated from each other and also isolated from the power line 12.

ESD protection circuits 21, 22, 23 of a common bus line protection scheme are connected between the power lines 13, 12, 14 and the common ground bus line 11. An ESD protection circuit 31 of a power-to-power protection scheme is connected between the power lines 13 and 12. An ESD protection circuit 32 of a power-to-power protection scheme is connected between the power lines 12 and 14.

An isolated-power supplied region having a circuit operated by a power supply potential supplied to the power lines 13 is placed and formed in the power line 13, and a CMOS inverter circuit 41 illustrates part of the circuit formed in this isolated-power supplied region.

Likewise, an isolated-power supplied region having a circuit operated by a power supply potential supplied to the power line 12 is placed and formed in the power line 12, and a CMOS inverter circuit 42 illustrates part of the circuit formed in this isolated-power supplied region.

Likewise, an isolated-power supplied region having a circuit operated by a power supply potential supplied to the power line 14 is placed and formed in the power line 12, and a CMOS inverter circuit 43 illustrates part of the circuit formed in this isolated-power supplied region.

An output signal of the inverter circuit 41 is supplied to the inverter circuits 42 and 43 as an input signal.

Furthermore, a buffer circuit 51 configured by, for example, a CMOS inverter circuit is inserted in a transmission path of the signal output from the inverter circuit 41 and input to the inverter circuit 43. The buffer circuit 51 is supplied with, as power supply potential, the potential of the power line 12 functioning as the common power bus line.

In addition, parasitic resistance is present in the common ground bus line 11 in this case as well, and this parasitic resistance is indicated by Rbus in FIG. 1.

Figure 2:
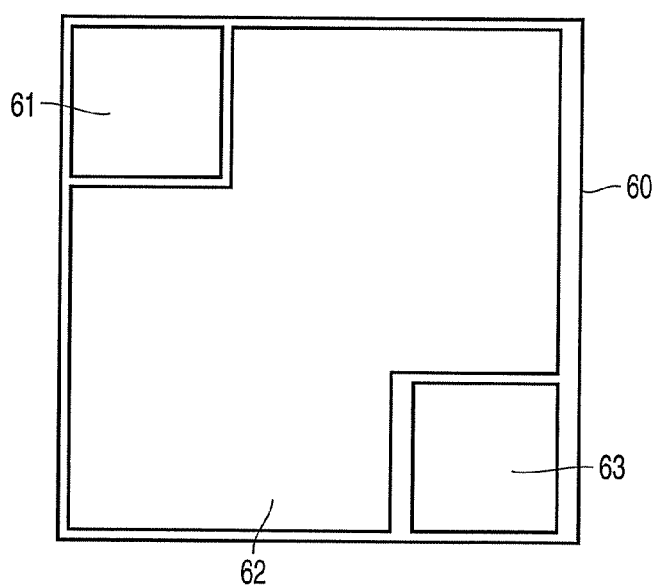
FIG. 2 is a schematic plan view of a chip of the LSI shown in FIG. 1.

FIG. 2 is a plan view of a chip of the LSI shown in FIG. 1. An LSI chip 60 includes an isolated-power supplied region 61, an isolated-power supplied region 62 and an isolated-power supplied region 63. In the isolated-power supplied region 61, there is formed an internal circuit which is operated by the power supply potential supplied to the power line 13 in FIG. 1 and which includes the inverter circuit 41 in FIG. 1. In the isolated-power supplied region 62, there is formed an internal circuit which is operated by the power supply potential supplied to the power line 12 in FIG. 1 and which includes the inverter circuit 42 and the buffer circuit 51 in FIG. 1. In the isolated-power supplied region 63, there is formed an internal circuit which is operated by the power supply potential supplied to the power line 14 in FIG. 1 and which includes the inverter circuit 43 in FIG. 1.

The isolated-power supplied regions 61 and 62 are adjacent within the chip 60, and the ESD protection circuit 31 shown in FIG. 1 is placed and formed at the border therebetween. Likewise, the isolated-power supplied regions 62 and 63 are adjacent within the chip 60, and the ESD protection circuit 32 shown in FIG. 1 is placed and formed at the border therebetween.

Figure 3:
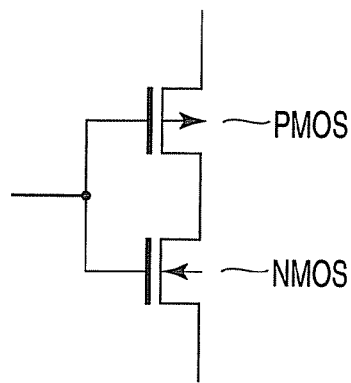
FIG. 3 is a circuit diagram showing the specific configuration of inverter circuits and a buffer circuit in FIG. 1.

FIG. 3 shows one example of the specific circuit configuration of the inverter circuits 41, 42, 43 and the buffer circuit 51 in FIG. 1. As shown, these inverter circuits and buffer circuit include a p-channel MOS (pMOS) transistor having a source connected to any of the power lines 13, 12, 14, and an n-channel MOS (nMOS) transistor having a drain connected to a drain of the pMOS transistor, a source connected to the common ground bus line 11 and a gate connected to a common gate of the pMOS transistor.

In the LSI having the above-mentioned configuration, if a surge voltage, whereby the common ground bus line 11 may have a ground voltage, is applied across any one of the power lines 13, 12, 14 and the common ground bus line 11, a discharge path is formed by any one of the ESD protection circuits 21, 22, 23 of the common bus line protection scheme, and a gate oxide film of the internal circuit formed in each isolated-power supplied region is protected against overcurrent caused by ESD.

Furthermore, if a surge voltage is applied across any two of the power interconnects 13, 12, 14, a discharge path is formed by the ESD protection circuit 31 or 32 of the power-to-power protection scheme, and the gate oxide film of the internal circuit formed in each isolated-power supplied region is protected against overcurrent caused by ESD.

Here, if, for example, a surge voltage is applied, whereby the power line 13 in FIG. 1 shows a positive pole and the power interconnect 14 shows a ground potential, a discharge path which extends through the ESD protection circuit 21, the common ground bus line 11 and the ESD protection circuit 23 is formed.

When a chip size is large or when the sheet resistivity of an interconnect material used in the common ground bus line 11 is high, it is impossible to sufficiently reduce the value of the parasitic resistance Rbus of the common ground bus line 11. In this case, a voltage in the power line 13 does not decrease to a voltage equal to or less than the sum of a clamp voltage of the ESD protection circuit 21, a drop voltage in the parasitic resistance Rbus of the common ground bus line 11 and a clamp voltage of the ESD protection circuit 23.

In the case described above, given that an input node of the inverter circuit 41 has a ground potential, the voltage in the power interconnect 13 is output from an output node of the inverter circuit 41. If the buffer circuit 51 is not provided and the inverter circuits 41 and 43 are connected to each other simply by an interconnect, the voltage of the power line 13 is directly transmitted to an input node of the inverter circuit 43, and a voltage equal to or more than a breakdown voltage of the gate oxide film might be applied across a gate and source of the p-channel MOS transistor constituting the inverter circuit 43.

However, in the LSI of the present embodiment, the buffer circuit 51 is inserted in the signal transmission path of the inverter circuits 41, 43. Moreover, the voltage of the power line 12 is set to a voltage of the power line 13 after the surge has been released and the intermediate voltage of the power line 14, by the parasitic capacitance between the power line 12 and the common ground bus line 11. Thus, the buffer circuit 51 connected to the power line 12 is operated, and its output node is set to a value close to the voltage of the common ground bus line 11, that is, the ground voltage.

Since the voltage close to the ground voltage is input to the input node of the inverter circuit 43, any voltage equal to or more than a breakdown voltage of the gate oxide film is not applied across the gate and source of the p-channel MOS transistor constituting the inverter circuit 43, and the breakage of the gate oxide film of the p-channel MOS transistor in the inverter circuit 43 which is a protected oxide film can be prevented.

In addition, when a surge voltage is applied across the power lines 13 and 14 as described above, an output voltage of the inverter circuit 41 is also applied to the input nodes of the inverter circuit 42 and the buffer circuit 51. However, in the n-channel MOS transistors within both of these circuits where the breakage of the gate oxide films is the problem in this case, the voltage across the gate and source in each circuit is not equal to or more than the sum of the clamp voltage of one ESD protection circuit (the ESD protection circuit 21) and the drop voltage in part of the parasitic resistance Rbus of the common ground bus line 11, so that there is no fear of the breakage of the gate oxide films.

FIG. 4 to FIG. 7 show examples of the specific circuit configuration of the ESD protection circuit 31, 32 of the power-to-power protection scheme in FIG. 1.

Figure 4:
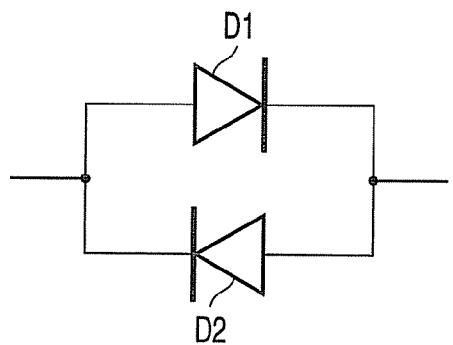
FIG. 4 is a circuit diagram showing the specific configuration of an ESD protection circuit of a power-to-power protection scheme in FIG. 1.

In the case of the ESD protection circuit in FIG. 4, two power supply nodes to which this ESD protection circuit is connected are supplied with power supply potentials of the same value, and the power supply is not partly shut off. This circuit comprises diodes D1, D2, the anodes and cathodes of which are connected in antiparallel with each other.

Figure 5:
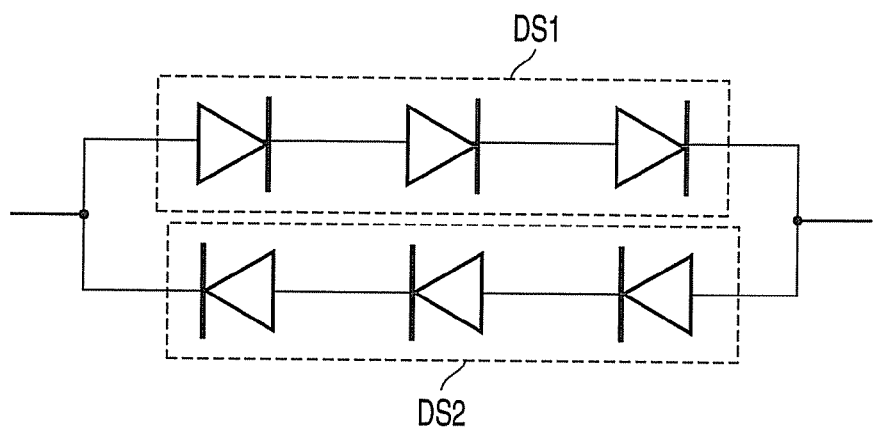
FIG. 5 is a circuit diagram showing the specific configuration of the ESD protection circuit of the power-to-power protection scheme in FIG. 1.

In the case of the ESD protection circuit in FIG. 5, two power supply nodes to which this ESD protection circuit is connected are supplied with power supply potentials of different values, and the power supply is partly shut off. This circuit comprises a plurality of diodes, the anodes and cathodes of which are in different directions. This circuit is composed of diode strings DS1, DS2 connected in parallel.

In the case of the ESD protection circuit in FIG. 6, two power supply nodes to which this ESD protection circuit is connected are supplied with power supply potentials of different values, and the power supply is partly shut off. This circuit is composed of thyristors SCR1, SCR2 connected in different directions between two power supply lines.

In the case of the ESD protection circuit in FIG. 7, two power supply lines to which this ESD protection circuit is connected are supplied with power supply potentials of different values, and the power supply is partly shut off. This circuit is a combination of the diode D2 shown in FIG. 4 and the diode string DS1 shown in FIG. 5.

In addition, the example in FIG. 7 shows a case where the power supply potential supplied to the power line in the left of this drawing is higher than the power supply potential supplied to the power line in the right of this drawing. In a reverse case, a combination of the diode D1 shown in FIG. 4 and the diode string DS2 shown in FIG. 5 may be used.

FIG. 8 is a circuit diagram of an LSI according to a modification of the first embodiment. In the case of the LSI described in the first embodiment shown in FIG. 1, only one common ground bus line 11 is provided in the chip. However, as shown in FIG. 8, the common ground bus line 11 may be modified and divided into, for example, two common ground bus lines 11a, 11b so that each of them is connected to an independent ground terminal supplied with a ground potential and so that the common ground bus lines 11a, 11b are connected to each other through an ESD protection circuit 71. In this case, a circuit having, for example, the configuration as shown in FIG. 4 can be used as the ESD protection circuit 71.

It is possible in this modification as well to obtain effects similar to the effects in the first embodiment.

Next, a method of designing the LSI according to the first embodiment is described. FIG. 9 shows a flowchart of this designing method.

Initially, step S1 plans the placement on the LSI chip in relation to the common ground bus line functioning as a ground potential supply line during a normal operation, the common power bus line functioning as a power line supplied with a power supply potential during a normal operation, and a plurality of isolated-power supplied regions (61, 62, 63 in FIG. 2) having circuits operated by power supply potentials which are supplied to the power supplies isolated from each other and also isolated from the common power bus line.

First, step S1 plans the placement on the LSI chip in relation to the first isolated-power supplied region (the region 62 in FIG. 2) having a circuit which operates between the common ground bus line supplied with a ground potential during a normal operation and the common power bus line supplied with a common power supply potential during the normal operation, the second and third isolated-power supplied regions (the regions 61, 63 in FIG. 2) each having a plurality of circuits which operate between the common ground bus line and a plurality of isolated power lines isolated from each other and supplied with power supply potentials different from the common power supply potential.

Then, step S2 plans the placement on the LSI chip in relation to a plurality of first electrostatic protection circuits (power-to-ground ESD protection circuits) (21, 22, 23) connected between the common power bus line as well as the plurality of isolated power lines and the common ground bus line, and a plurality of second electrostatic protection circuits (power-to-power ESD protection circuits) (31, 32) connected between the plurality of isolated power lines and the common power bus line.

Then, step S3 judges the presence of a signal transmission between the circuits in the isolated-power supplied regions which are not adjacent on the LSI chip. If the judgment in step S3 is "absence", the placement/routing (P and R) processing of the circuits is then performed in step S6, and the designing is finished.

In the case of the LSI in the first embodiment shown in FIG. 1, a signal transmission is present between the circuit (inverter circuit 41) in the isolated-power supplied region 61 and the circuit (inverter circuit 43) in the isolated-power supplied region 63 which are not adjacent to each other on the LSI chip. Therefore, the judgment in step S3 is "presence", and step S4 amends circuit data so that the signal may be buffered in the isolated-power supplied region using the common power bus line as a power supply along the transmission path where this signal transmission is carried out. That is, the data on the circuits on the LSI chip is corrected in order to insert the buffer circuit 51 using the potential of the common power bus line 12 as a power supply potential.

After the data amendment, step S5 then judges whether the circuits can be actually amended. If the circuits are amendable (yes), the placement/routing (P and R) processing of the circuits is performed in step S6. If not (no), a return is made to initial step S1, and the placement on the LSI chip is planned in relation to the common ground bus line, the common power bus line and a plurality of isolated-power supplied regions.

In this manner, it is possible to design an LSI chip where the buffer circuit using the potential of the common power bus line as a power supply potential is inserted along the transmission path of the signal which is output from the first circuit operated by the power supply potential of the first one of a plurality of power lines and which is input to the second circuit operated by the power supply potential of the second one of the plurality of power lines different from the first power line.

Figure 10:
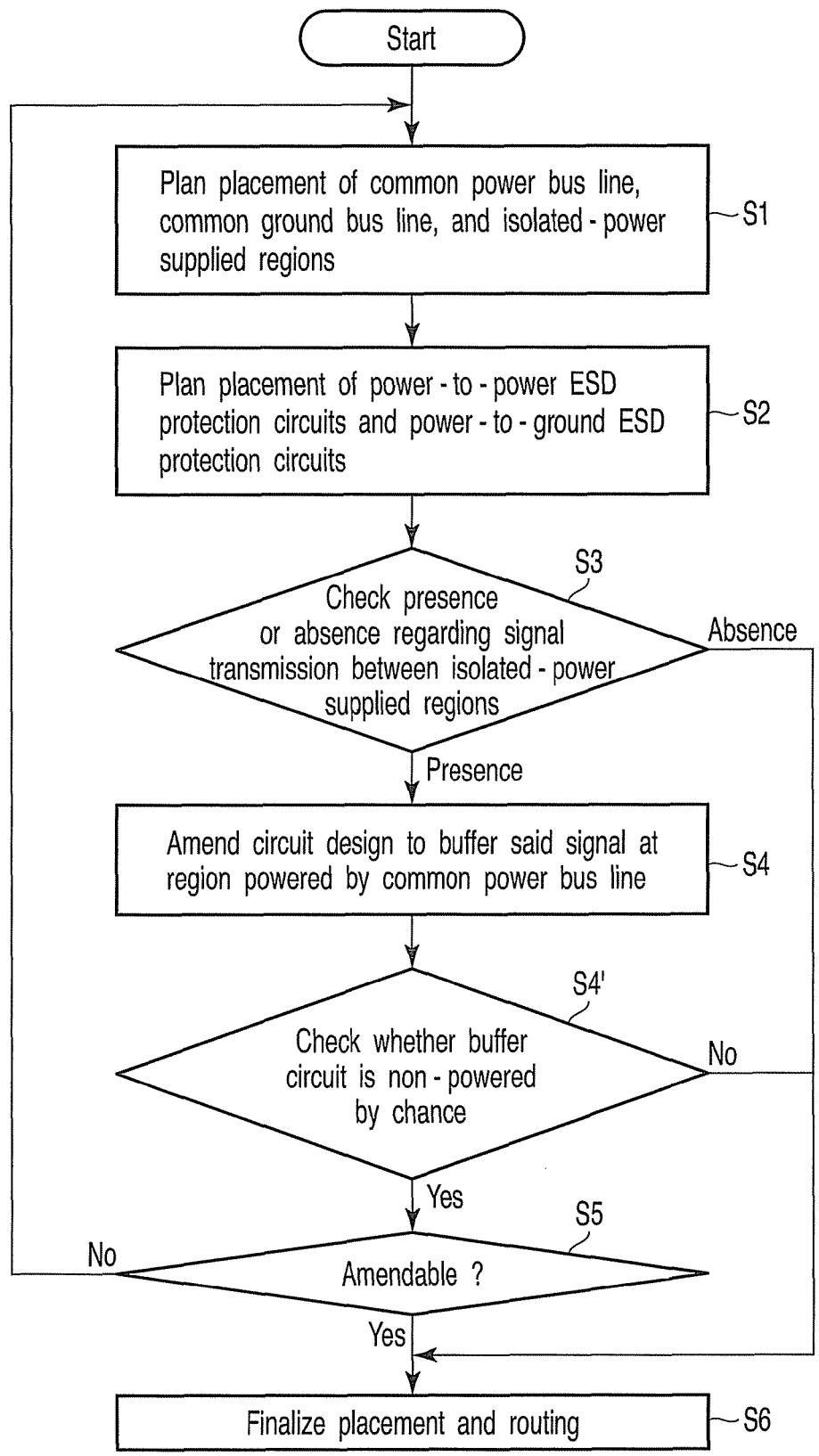
FIG. 10 shows a modification of the flowchart in FIG. 9.

In addition, when there is a possibility that the common power supply potential is shut off in the first isolated-power supplied region (61) supplied with the common power supply potential, a step is added after step S4 and before step S5 to judge whether the isolated-power supplied region where the buffer circuit is placed is an isolated-power supplied region in which the power supply potential supplied to the power line is shut off. If the isolated-power supplied region where the buffer circuit is placed is judged to be the isolated-power supplied region in which the power supply potential is shut off (non-powered by chance), the flowchart may be changed to make an amendment so that the buffer circuit is placed in the isolated-power supplied region (62 or 63) in which the power supply potential is not shut off. Such a flowchart is shown in FIG. 10 (S4').

As described above, according to the first embodiment, it is possible to provide a semiconductor integrated circuit designing method wherein even when a signal is transmitted between isolated-power supplied regions which are not adjacent within a chip, internal circuits can be securely protected against an ESD.

Second Embodiment

Figure 11:
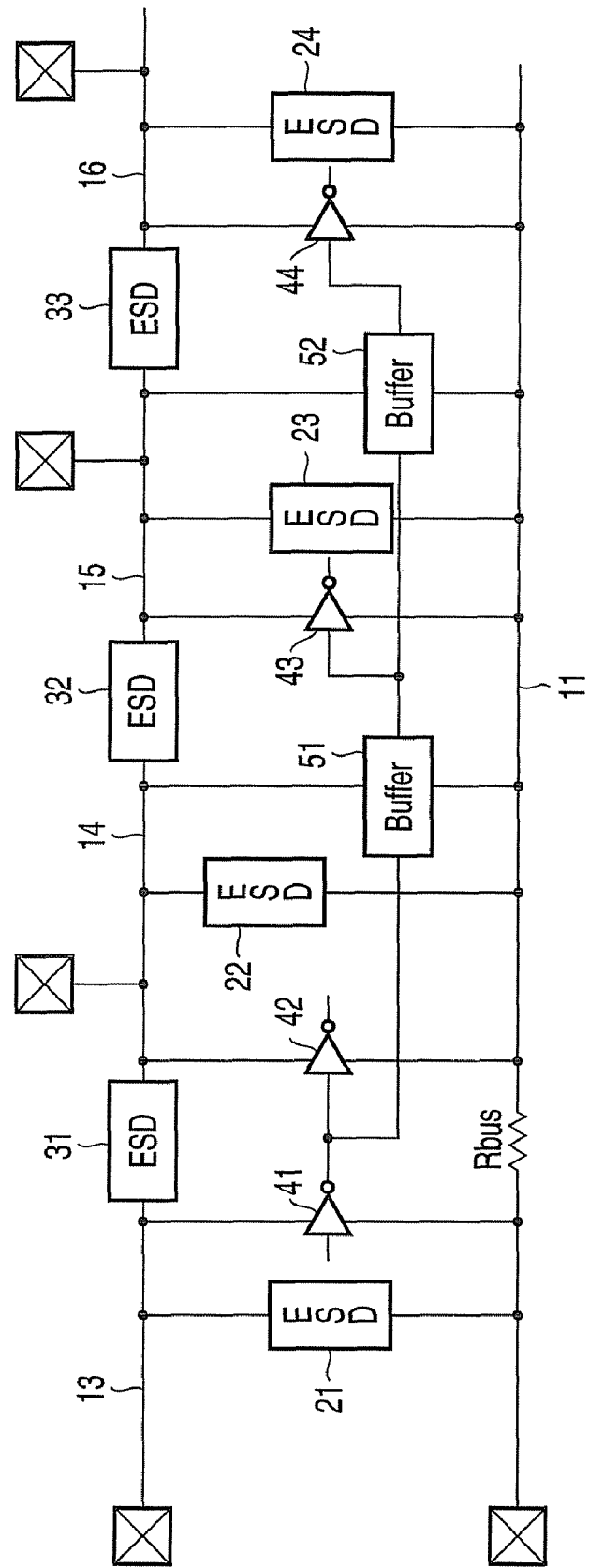
FIG. 11 is a circuit diagram of an LSI according to a second embodiment of the present invention.

FIG. 11 is a circuit diagram of an LSI according to a second embodiment of the present invention. In FIG. 11, 11 denotes a common ground bus line which is connected to a ground terminal supplied with a ground potential and which functions as a grounding interconnect during a normal operation, and 13 to 16 denote power lines which are connected to power supply terminals supplied with power supply potentials during a normal operation and which are isolated from each other.

ESD protection circuits 21 to 24 of a common bus line protection scheme are connected between the power lines 13 to 16 and the common ground bus line 11. An ESD protection circuit 31 of a power-to-power protection scheme is connected between the power lines 13 and 14, and an ESD protection circuit 32 of a power-to-power protection scheme is connected between the power lines 14 and 15, and moreover, an ESD protection circuit 33 of a power-to-power protection scheme is connected between the power lines 15 and 16.

An isolated-power supplied region having a circuit operated by a power supply potential supplied to the power line 13 is placed and formed in the power line 13, and a CMOS inverter circuit 41 illustrates part of the internal circuit formed in this isolated-power supplied region.

An isolated-power supplied region having a circuit operated by a power supply potential supplied to the power line 14 is placed and formed in the power line 14, and a CMOS inverter circuit 42 illustrates part of the internal circuit formed in this isolated-power supplied region.

An isolated-power supplied region having a circuit operated by a power supply potential supplied to the power line 15 is placed and formed in the power line 15, and a CMOS inverter circuit 43 illustrates part of the internal circuit formed in this isolated-power supplied region.

An isolated-power supplied region having a circuit operated by a power supply potential supplied to the power line 16 is placed and formed in the power line 16, and a CMOS inverter circuit 44 illustrates part of the internal circuit formed in this isolated-power supplied region.

An output signal of the inverter circuit 41 is supplied to the inverter circuits 42, 43 and 44 as an input signal. In this case, a buffer circuit 51 configured by, for example, a CMOS inverter circuit is inserted along a transmission path of the signal output from the inverter circuit 41 and input to the inverter circuit 43. Further, the buffer circuit 51 and a buffer circuit 52 configured by a CMOS inverter circuit are inserted in series in a transmission path of the signal output from the inverter circuit 41 and input to the inverter circuit 44. The potential of the power line 14 is supplied to the buffer circuit 51 as a power supply potential, and the potential of the power line 15 is supplied to the buffer circuit 52 as a power supply potential.

In addition, parasitic resistance is present in the common ground bus line 11 in this case as well, and this parasitic resistance is indicated by Rbus in FIG. 11.

The inverter circuits 41 to 44 and the buffer circuits 51, 52 in FIG. 11 are respectively configured by pMOS transistors and nMOS transistors as in the case of FIG. 3. Moreover, the ESD protection circuits 31 to 33 of the power-to-power protection scheme in FIG. 11 are configured as in the cases of FIG. 4 to FIG. 7.

Figure 12:
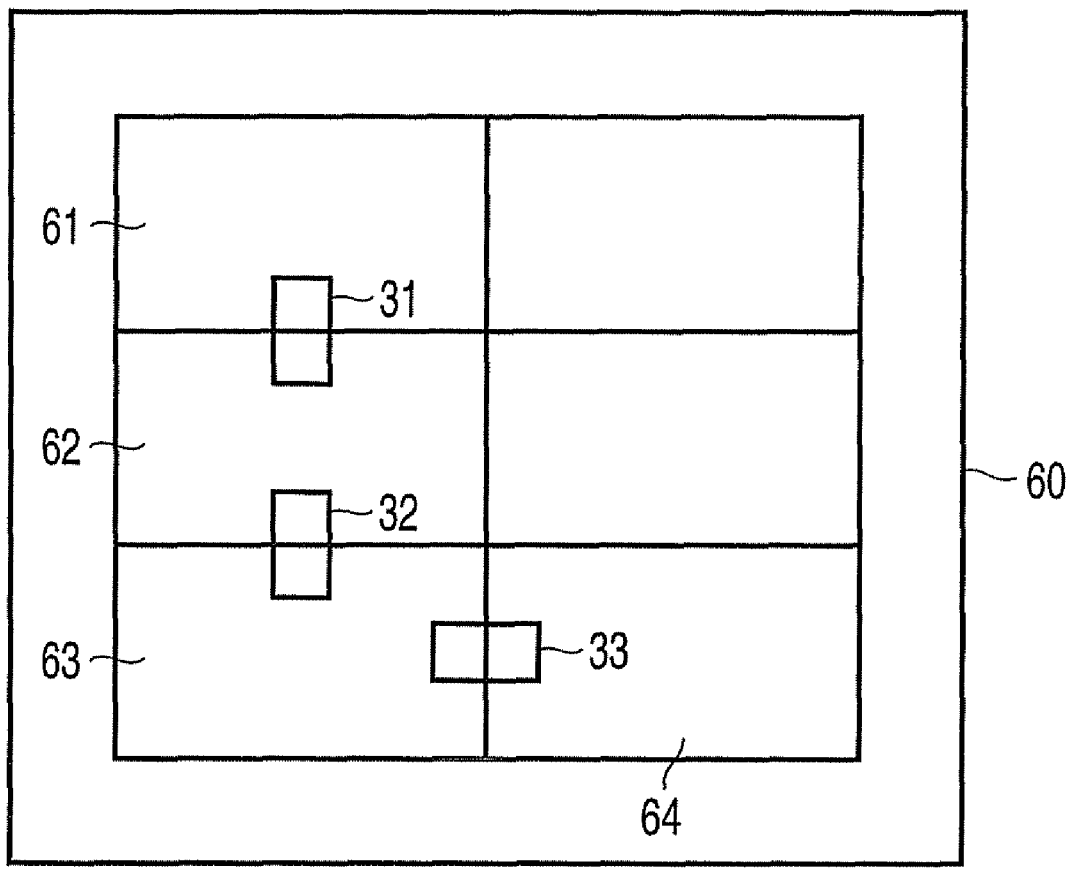
FIG. 12 is a schematic plan view of a chip of the LSI shown in FIG. 11.

FIG. 12 is a plan view of a chip of the LSI shown in FIG. 11. An LSI chip 60 includes isolated-power supplied regions 61, 62, 63 and 64.

In the isolated-power supplied region 61, there is formed an internal circuit which is operated by the power supply potential supplied to the power line 13 in FIG. 11 and which includes the inverter circuit 41 in FIG. 1.

In the isolated-power supplied region 62, there is formed an internal circuit which is operated by the power supply potential supplied to the power line 14 in FIG. 11 and which includes the inverter circuits 42 and the buffer circuit 51 in FIG. 11.

In the isolated-power supplied region 63, there is formed an internal circuit which is operated by the power supply potential supplied to the power line 15 in FIG. 11 and which includes the inverter circuit 43 and the buffer circuit 52 in FIG. 11.

In the isolated-power supplied region 64, there is formed an internal circuit which is operated by the power supply potential supplied to the power line 16 in FIG. 11 and which includes the inverter circuit 44 in FIG. 11.

The isolated-power supplied regions 61 and 62 are adjacent to each other in the chip 60, and the ESD protection circuit 31 shown in FIG. 11 is placed and formed at the border therebetween. Likewise, the isolated-power supplied regions 62 and 63 are adjacent to each other in the chip 60, and the ESD protection circuit 32 shown in FIG. 11 is placed and formed at the border therebetween. Moreover, the isolated-power supplied regions 63 and 64 are adjacent to each other in the chip 60, and the ESD protection circuit 33 shown in FIG. 11 is placed and formed at the border therebetween.

That is, the output signal of the inverter circuit 41 operated by the power supply potential supplied to the power line 13 is input to the buffer circuit 51, and the buffer circuit 51 supplies an input signal to the inverter circuit 43 operated by the power supply potential supplied to the power line 15 different from the power line 13. The ESD protection circuits 31, 32 are connected between the power lines 13 and 14 and between the power lines 14 and 15 in parallel with the transmission path of the signal from the inverter circuit 41 to the buffer circuit 51 and the inverter circuit 43.

Furthermore, the output signal of the inverter circuit 41 operated by the power supply potential supplied to the power line 13 is input to the buffer circuits 51 and 52, and the buffer circuits 51 and 52 supply an input signal to the inverter circuit 44 operated by the power supply potential supplied to the power line 16 different from the power line 13. The ESD protection circuits 31, 32, 33 are inserted in series between the power lines 13 and 16 in parallel with the transmission path of the signal from the inverter circuit 41 to the buffer circuits 51, 52 and the inverter circuit 44.

In the LSI having the above-mentioned configuration, if a surge voltage, whereby the common ground bus line 11 may have a ground voltage, is applied across any one of the power lines 13 to 16 and the common ground bus line 11, a discharge path is formed by any one of the ESD protection circuits 21 to 24 of the common bus line protection scheme, and a gate oxide film of the internal circuit formed in each isolated-power supplied region is protected against overcurrent caused by ESD.

Furthermore, if a surge voltage is applied across any two of the power lines 13 to 16, a discharge path is formed by the ESD protection circuit 31 or 32 or 33 of the power-to-power protection scheme, and the gate oxide film of the internal circuit formed in each isolated-power supplied region is protected against overcurrent caused by ESD.

Here, if, for example, a surge voltage is applied whereby the power line 13 in FIG. 11 shows a positive pole and the power line 16 shows a ground potential, a discharge path which extends through the ESD protection circuit 21, the common ground bus line 11 and the ESD protection circuit 24 is formed.

When a chip size is large or when the sheet resistivity of an interconnect material used in the common ground bus line 11 is high, it is impossible to sufficiently reduce the value of the parasitic resistance Rbus of the common ground bus line 11.

In this case, a voltage in the power line 13 does not decrease to a voltage equal to or less than the sum of a clamp voltage of the ESD protection circuit 21, a drop voltage in the parasitic resistance Rbus of the common ground bus line 11 and a clamp voltage of the ESD protection circuit 24. Moreover, for example, given that an input node of the inverter circuit 41 has a ground potential, the voltage in the power line 13 is output from an output node of the inverter circuit 41.

If the buffer circuits 51 and 52 are not provided and the connection between the inverter circuits 41 and 43 and the connection between the inverter circuits 41 and 44 are simply produced by interconnects, the voltage of the power line 13 is transmitted to input nodes of the inverter circuits 43, 44, and a voltage equal to or more than a breakdown voltage of the gate oxide film might be applied across a gate and source of the p-channel MOS transistor constituting the inverter circuit 43, 44.

However, in the LSI of the present embodiment, the buffer circuits 51 and 52 are inserted in the signal transmission paths of the inverter circuits 41, 43, 44, so that as in the first embodiment, the voltage of the output node of the inverter circuit 44 can be set to a value close to the ground voltage.

Thus, no high voltage is applied across the gate and source of the p-channel MOS transistor in the inverter circuit 44, and it is possible to prevent the breakage of the gate oxide film of the p-channel MOS transistor in the inverter circuit 43 which is a protected oxide film.

Figure 13:
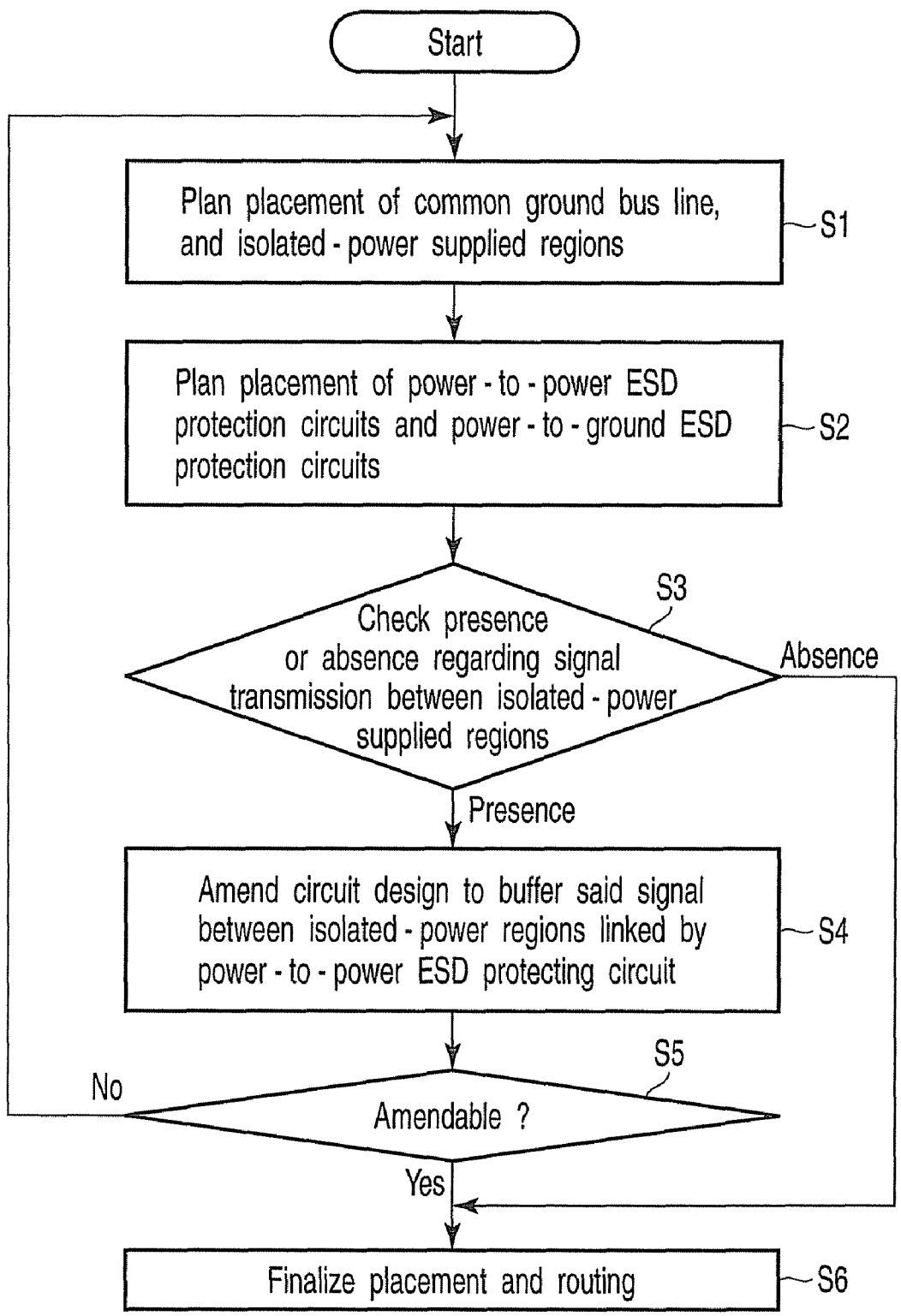
FIG. 13 is a flowchart of a method of designing the LSI according to the second embodiment.

Next, a method of designing the LSI according to the second embodiment is described. FIG. 13 shows a flowchart of this designing method.

First, step S1 plans the placement on the LSI chip in relation to the common ground bus line functioning as a ground potential supply node during a normal operation, and a plurality of isolated-power supplied regions (the regions 61 to 64 in FIG. 12).

Then, step S2 plans the placement on the LSI chip in relation to a plurality of first electrostatic protection circuits (power-to-ground ESD protection circuits) (21 to 24) connected between the plurality of isolated power lines and the common ground bus line, and a plurality of second electrostatic protection circuits (power-to-power ESD protection circuits) (31 to 33) connected between the power lines of the plurality of isolated power regions.

Then, step S3 judges the presence of a signal transmission between the circuits in the plurality of isolated-power supplied regions which are not adjacent on the LSI chip. If the judgment in step S3 is "absence", the placement/routing (P and R) processing of the circuits is then performed in step S6, and the designing is finished.

In the case of the LSI in the second embodiment shown in FIG. 11, the judgment in step S3 is "presence" because there are a signal transmission present between the circuit (inverter circuit 41) in the isolated-power supplied region 61 and the circuit (inverter circuit 43) in the isolated-power supplied region 63 which are not adjacent to each other on the LSI chip, and a signal transmission present between the circuit (inverter circuit 41) in the isolated-power supplied region 61 and the circuit (inverter circuit 44) in the isolated-power supplied region 64.

Then, step S4 amends circuit data to place the buffer circuit 51 for buffering in the isolated-power supplied region 62 so that the signal may be transmitted between the power lines 13, 15 to which the ESD protection circuits 31, 32 are connected, and to place the buffer circuit 52 for buffering in the isolated-power supplied region 63 so that the signal may be transmitted between the power lines 14, 16 to which the ESD protection circuits 32, 33 are connected.

After the data amendment, step S5 then judges whether the circuits can be actually amended. If the circuits are amendable (yes), the placement/routing (P and R) processing of the circuits is performed in step S6. If not (no), a return is made to initial step S1, and the placement on the LSI chip is planned from the start in relation to the common ground bus line and a plurality of isolated-power supplied regions.

In this manner, it is possible to design an LSI chip wherein the buffer circuit is placed to which the output signal of the first circuit operated by the power supply potential supplied to the first one of a plurality of power lines is input and which supplies an input signal to the second circuit operated by the power supply potential supplied to the second power line different from the first power line and wherein the ESD protection circuits of the power-to-power protection scheme are inserted in serial between a plurality of power lines in parallel with the transmission path of the signal from the first circuit to the buffer circuit and the second circuit.

Figure 14:
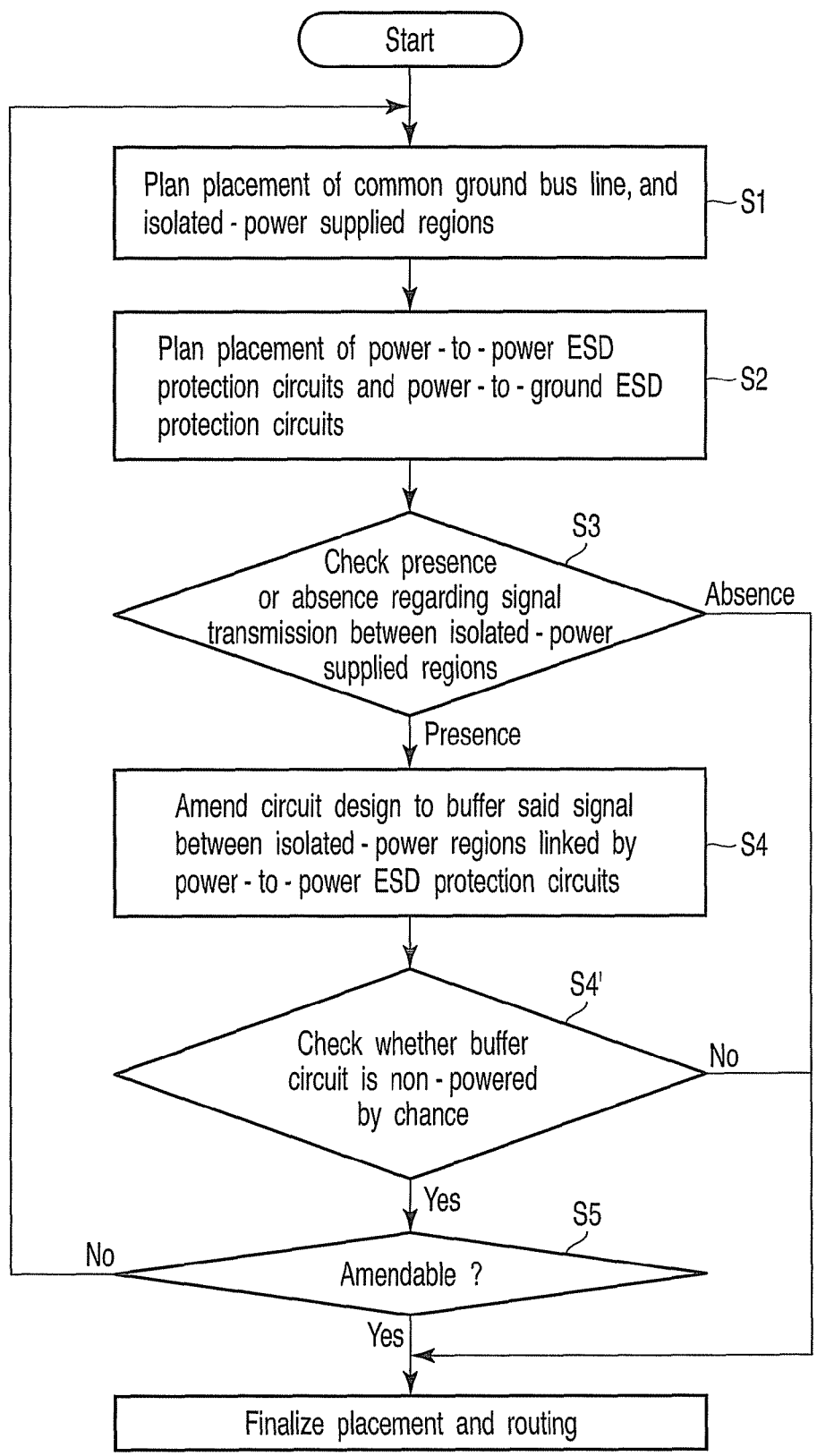
FIG. 14 shows a modification of the flowchart in FIG. 13.

In addition, in the present embodiment as well, when a plurality of isolated-power supplied regions include a region in which the power supply potential supplied to the power line thereof is shut off, a step may be added after step S4 and before step S5 to judge whether the isolated-power supplied region where the buffer circuit is placed is an isolated-power supplied region in which the power supply potential supplied to the power line is shut off. If the isolated-power supplied region where the buffer circuit is placed is judged to be the isolated-power supplied region in which the power supply potential is shut off (non-powered by chance), the flowchart may be changed so that the location of the buffer circuit is changed to the isolated-power supplied region in which the power supply potential is not shut off. Such a flowchart is shown in FIG. 14 (S4').

Furthermore, in the second embodiment as well, a third ESD protection circuit can be inserted in the common ground bus line 11 as in FIG. 8 in the first embodiment to achieve similar effects.

As described above, according to the second embodiment, it is also possible to provide a semiconductor integrated circuit designing method wherein when a signal is transmitted between isolated-power supplied regions which are not adjacent within a chip, internal circuits can be securely protected against ESD.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:
1. A method of designing a semiconductor integrated circuit comprising:

planning placement on a semiconductor integrated circuit chip in relation to a first isolated-power supplied region having a circuit which operates between a common ground bus line functioning as a ground potential node and a common power bus line supplied with a common power supply potential during a normal operation, and second and third isolated-power supplied regions so as to sandwich the first isolated-power supplied region, the second and third isolated-power supplied regions having a circuit which operates between the common ground bus line and first and second isolated power lines, respectively, the first and second isolated power lines being isolated from each other and being supplied with power supply potentials different from the common power supply potential;

planning placement on the semiconductor integrated circuit chip in relation to a plurality of first electrostatic protection circuits connected between the common ground bus line and the common power bus line as well as between the common ground bus line and the first and second isolated power lines, and a plurality of second electrostatic protection circuits connected between the first and second isolated power lines and the common power bus lines;

judging presence of a signal transmission between the second and third isolated-power supplied regions; and amending a circuit configuration on the semiconductor integrated circuit chip to insert a buffer circuit using the common power bus line as a power supply in a transmission path where the signal transmission is carried out when the signal transmission is judged to be present in said judging presence of the signal transmission.

2. The method according to claim 1, when the first and second isolated power lines and the common power bus line include a chance where a supplied power supply potential is shut off, the method further comprising judging whether the common power supply potential is shut off after said judging presence of the signal transmission, a connection change being made, when the common power supply potential is shut off, in order to use, as a power supply of the buffer circuit, potential of one of the first and second isolated power lines, power supply potential of which is not shut off.

3. The method according to claim 2, wherein said inserting a buffer circuit includes making an insertion such that the buffer circuit is operated through the common ground bus line and one of the first and second isolated power lines, power supply potential of which is not shut off.

4. The method according to claim 1, wherein said planning placement of the plurality of second electrostatic protection circuits includes placing the plurality of second electrostatic protection circuits between the first isolated-power supplied region and the second isolated-power supplied region and between the second isolated-power supplied region and the third isolated-power supplied region.

5. The method according to claim 1, wherein said placing the first and second electrostatic protection circuits includes placing electrostatic protection circuits having diodes or SCRs connected in antiparallel.

6. The method according to claim 1, further comprising inserting a third electrostatic protection circuit in the common ground bus line.

7. The method according to claim 6, wherein said placing the third electrostatic protection circuit includes placing an electrostatic protection circuit having diodes or SCRs connected in antiparallel.

8. A method of designing a semiconductor integrated circuit comprising:

planning placement on a semiconductor integrated circuit chip in relation to a common ground bus line functioning as a ground potential node and a plurality of isolated-power supplied regions each having a circuit operated by power supply potentials which are supplied to a plurality of isolated power lines isolated from each other;

planning placement on the semiconductor integrated circuit chip in relation to a plurality of first electrostatic protection circuits connected between the plurality of isolated power lines and the common ground bus line, and a plurality of second electrostatic protection circuits connected between the plurality of adjacent isolated power lines;

judging presence of a signal transmission between circuits in two isolated-power supplied regions placed apart without having a common border line therebetween among the plurality of isolated-power supplied regions;

and amending circuit configuration on the semiconductor integrated circuit chip to place a buffer circuit between the circuits in the two isolated-power supplied regions when the signal transmission is judged to be present in said judging presence of the signal transmission.

9. The method according to claim 8, when the plurality of power lines include a power line, a supplied power supply potential of which is shut off by chance, the method further comprising judging whether the isolated-power supplied region, in which the buffer circuit is placed, is an isolated-power supplied region, a power supply potential of which is shut off by chance, after said judging the presence of the signal transmission, an amendment being made such that the placement of the buffer circuit is changed to an isolated-power supplied region, a power supply potential of which is not shut off, when the isolated-power supplied region, in which the buffer circuit is placed, 'is the isolated-power supplied region, the power supply potential of which is shut off.

10. The method according to claim 9, wherein the placement of the buffer circuit includes placing the buffer circuit such that the buffer circuit is operated through the common ground bus line and one of the plurality of power lines, power supply potential of which is not shut off.

11. The method according to claim 8, wherein said planning placement of the plurality of second electrostatic protection circuits includes placing the plurality of second electrostatic protection circuits between the plurality of adjacent isolated-power supplied regions.

12. The method according to claim 8, wherein said placing the first and second electrostatic protection circuits includes placing electrostatic protection circuits having diodes or SCRs connected in antiparallel.

13. The method according to claim 8, further comprising inserting a third electrostatic protection circuit in the common ground bus line.

14. The method according to claim 13, wherein said inserting the third electrostatic protection circuit includes inserting an electrostatic protection circuit having diodes or SCRs connected in antiparallel.

* * * * *